United States Patent
Verdouw

(10) Patent No.: US 7,549,390 B2
(45) Date of Patent: Jun. 23, 2009

(54) GAUGE WITH ILLUMINATED DIAL AND POINTER

(75) Inventor: James Verdouw, Rockford, IL (US)

(73) Assignee: Auto Meter Products, Inc., Sycamore, IL (US)

( * ) Notice: Subject to any disclaimer, the term of this patent is extended or adjusted under 35 U.S.C. 154(b) by 0 days.

(21) Appl. No.: 11/411,845

(22) Filed: Apr. 27, 2006

(65) Prior Publication Data

US 2006/0243191 A1 Nov. 2, 2006

Related U.S. Application Data

(60) Provisional application No. 60/675,855, filed on Apr. 29, 2005.

(51) Int. Cl.
*G01D 11/28* (2006.01)

(52) U.S. Cl. ............... 116/288; 116/286; 116/332; 116/DIG. 5; 116/DIG. 36; 362/26; 362/30

(58) Field of Classification Search ............... 116/284, 116/286–288, DIG. 5, DIG. 6, DIG. 36, 305, 116/328, 332, 46–49, 62.1; 362/26, 27, 29, 362/30

See application file for complete search history.

(56) References Cited

U.S. PATENT DOCUMENTS

| | | | | |
|---|---|---|---|---|
| 2,287,605 A | * | 6/1942 | Dickson et al. ............ | 116/62.3 |
| 2,916,011 A | * | 12/1959 | Molis ....................... | 116/288 |
| 3,511,211 A | * | 5/1970 | Horne et al. ............... | 116/286 |
| 4,004,546 A | * | 1/1977 | Harland .................... | 116/288 |
| 4,044,708 A | | 8/1977 | Klein | |
| 4,163,428 A | | 8/1979 | Ishikawa | |
| 4,215,647 A | | 8/1980 | Fukasawa | |
| 4,217,625 A | | 8/1980 | Klein | |
| 4,218,726 A | | 8/1980 | Fukasawa et al. | |
| 4,233,927 A | * | 11/1980 | Oikawa et al. ............ | 116/287 |
| 4,258,643 A | * | 3/1981 | Ishikawa et al. .......... | 116/286 |
| 4,274,358 A | | 6/1981 | Nakamura et al. | |

(Continued)

FOREIGN PATENT DOCUMENTS

JP 11083553 A * 3/1999

OTHER PUBLICATIONS

"Twister Halo 778" Permlight Corperation 1995.*

(Continued)

*Primary Examiner*—Amy Cohen Johnson
(74) *Attorney, Agent, or Firm*—Dickstein Shapiro LLP

(57) ABSTRACT

A gauge with a light transmitting pointer and a light-transmitting dial plate having a surface with indicia for a variable represented by the dial, at least one light source facing a hub of the pointer and positioned rearwardly from the rear surface of the dial plate for illuminating the dial plate. The light-transmitting pointer is mounted for rotational movement about an axis normal to the dial plate. The pointer hub is concentric with the axis, extending through the dial plate and projecting both forwardly and rearwardly from the plate, and an indicator projecting laterally from the hub across a portion of the front surface of the dial plate. The portion of the hub extending rearwardly of the dial plate is shaped to capture light directly from the light source so that light enters the hub and propagates forwardly through the hub, and then laterally from the hub into the indicator to illuminate the indicator.

33 Claims, 5 Drawing Sheets

U.S. PATENT DOCUMENTS

| | | | | |
|---|---|---|---|---|
| 4,323,951 | A * | 4/1982 | Pasco | 362/27 |
| 4,380,043 | A * | 4/1983 | Takamatsu et al. | 362/26 |
| 4,625,262 | A * | 11/1986 | Sakakibara et al. | 362/26 |
| 4,768,461 | A * | 9/1988 | Knietzsch et al. | 116/328 |
| 4,771,368 | A | 9/1988 | Tsukamoto et al. | |
| 4,807,090 | A * | 2/1989 | Mandellos et al. | 362/26 |
| 4,872,093 | A * | 10/1989 | Shimizu | 362/26 |
| 5,047,761 | A * | 9/1991 | Sell | 340/815.42 |
| 5,483,427 | A * | 1/1996 | Dealey et al. | 362/485 |
| 5,529,014 | A * | 6/1996 | Ohta et al. | 116/286 |
| 5,556,187 | A | 9/1996 | Furuya et al. | |
| 5,797,345 | A * | 8/1998 | Evans et al. | 116/286 |
| 5,839,811 | A | 11/1998 | Shimura | |
| 5,915,822 | A | 6/1999 | Ogura et al. | |
| 5,934,782 | A | 8/1999 | Atkins et al. | |
| 5,975,728 | A | 11/1999 | Weyer | |
| 6,082,288 | A * | 7/2000 | Kato et al. | 116/286 |
| 6,276,809 | B1 | 8/2001 | Matsumoto | |
| 6,499,852 | B1 | 12/2002 | Kino et al. | |
| 6,558,013 | B2 * | 5/2003 | Tholin et al. | 362/29 |
| 6,595,667 | B1 * | 7/2003 | Obata | 362/489 |
| 6,663,251 | B2 | 12/2003 | Calvert | |
| 6,714,126 | B2 | 3/2004 | Wada | |
| 6,783,257 | B2 | 8/2004 | Yoneda | |
| 6,811,278 | B2 | 11/2004 | Sung | |
| 6,926,417 | B2 * | 8/2005 | Mikami | 362/23 |
| 6,955,438 | B2 * | 10/2005 | Ishii | 362/29 |
| 2004/0145885 | A1 | 7/2004 | Chen | |
| 2007/0039541 | A1 * | 2/2007 | Vuilliomenet et al. | 116/288 |

OTHER PUBLICATIONS

Machine Translation of Japanese Patent JP 11083553A performed Jan. 27, 2009.*

Written Opinion of the International Searching Authority, Apr. 28, 2006.

* cited by examiner

GAUGE WITH ILLUMINATED DIAL AND POINTER

This application claims priority from U.S. Provisional Application No. 60/675,855, filed on Apr. 29, 2005, which is hereby incorporated by reference in its entirety.

FIELD OF THE INVENTION

The present invention relates generally to gauges and, more particularly, to gauges having illuminated dials and pointers such as the gauges used in automotive applications for speedometers, fuel gauges and the like.

BACKGROUND OF THE INVENTION

Gauges with illuminated dials and pointers have been made for many years, and for a variety of different applications. One of the largest applications for such gauges is the automotive industry where gauges having illuminated dials and pointers are used in large numbers, and have been in use for many years. Much effort has gone into the development of such gauges that can be efficiently and economically manufactured and that are aesthetically pleasing. Numerous patents have been issued on various designs and constructions for such gauges, such as U.S. Pat. Nos. 4,163,428; 4,215,647; 4,218,726; 4,274,358; 4,771,368; 5,839,811; 5,915,822; 5,934,782; 6,276,809 and 6,663,251.

SUMMARY OF THE INVENTION

It is one object of the present invention to provide an improved design for a gauge having an illuminated dial and pointer, that can be efficiently manufactured at a relatively low cost because of the simplicity of the construction, and yet still provides good illumination of the dial and pointer and is aesthetically pleasing. In this connection, one specific object of this invention is to provide such an improved gauge that does not require a separate light source for the pointer.

It is a further object of the present invention to provide such an improved gauge that has relatively few parts and can be made small, compact and lightweight.

Another object of the invention is to provide such an improved gauge that illuminates the pointer uniformly regardless of the angular position of the pointer.

A still further object of the present invention is to provide such an improved gauge which generates very little heat.

It is a further object of the invention to provide an improved gauge that illuminates the pointer and may be implemented in a variety of gauge arrangements.

A still further object of the invention is to provide an improved gauge in which hot spots are eliminated.

In accordance with the invention, there is therefore provided a gauge comprising a light-transmitting pointer and a light-transmitting dial plate having a front surface with indicia for a variable represented by the dial, at least one light source facing the pointer hub and positioned rearwardly from the rear surface of the dial plate for illuminating the dial plate. The light-transmitting pointer is mounted for rotational movement about an axis normal to the dial plate. The pointer hub is concentric with the axis, extending through the dial plate and projecting both forwardly and rearwardly from the plate, and an indicator projecting laterally from the hub across a portion of the front surface of the dial plate. The portion of the hub extending rearwardly of the dial plate is shaped to capture light directly from the light source so that light enters the hub and propagates forwardly through the hub, and then laterally from the hub into the indicator to illuminate the indicator.

BRIEF DESCRIPTION OF THE DRAWINGS

The invention will now be described in connection with a preferred embodiment with reference to the following illustrative figures so that it may be more fully understood. It will be understood that the particulars shown are by way of example and for purposes of illustrative discussion of the preferred embodiment of the present invention only, and are presented to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DETAILED DESCRIPTION OF THE INVENTION

Figure 1:
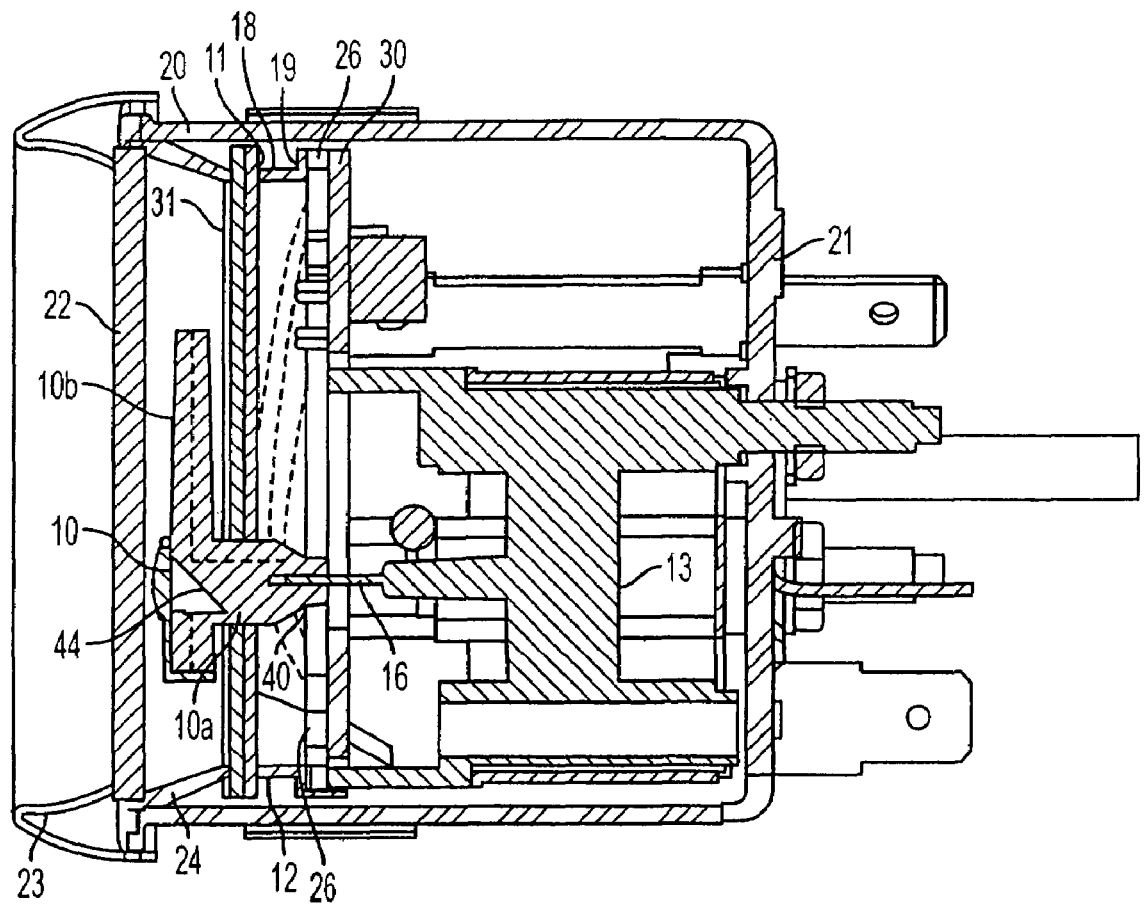
FIG. 1 is a longitudinal cross-sectional view of an automotive gauge according to one embodiment of the invention.
Figure 2:
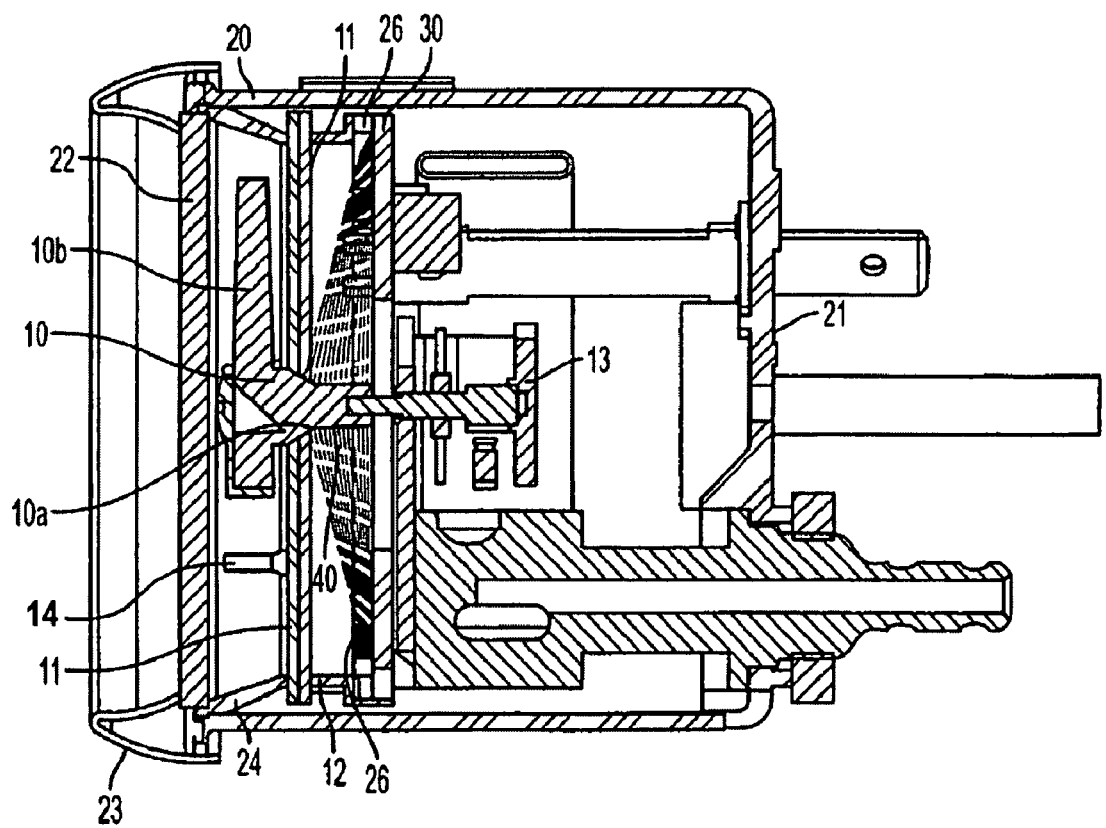
FIG. 2 is a longitudinal cross-section view of an automotive gauge according to one embodiment of the invention.
Figure 7:
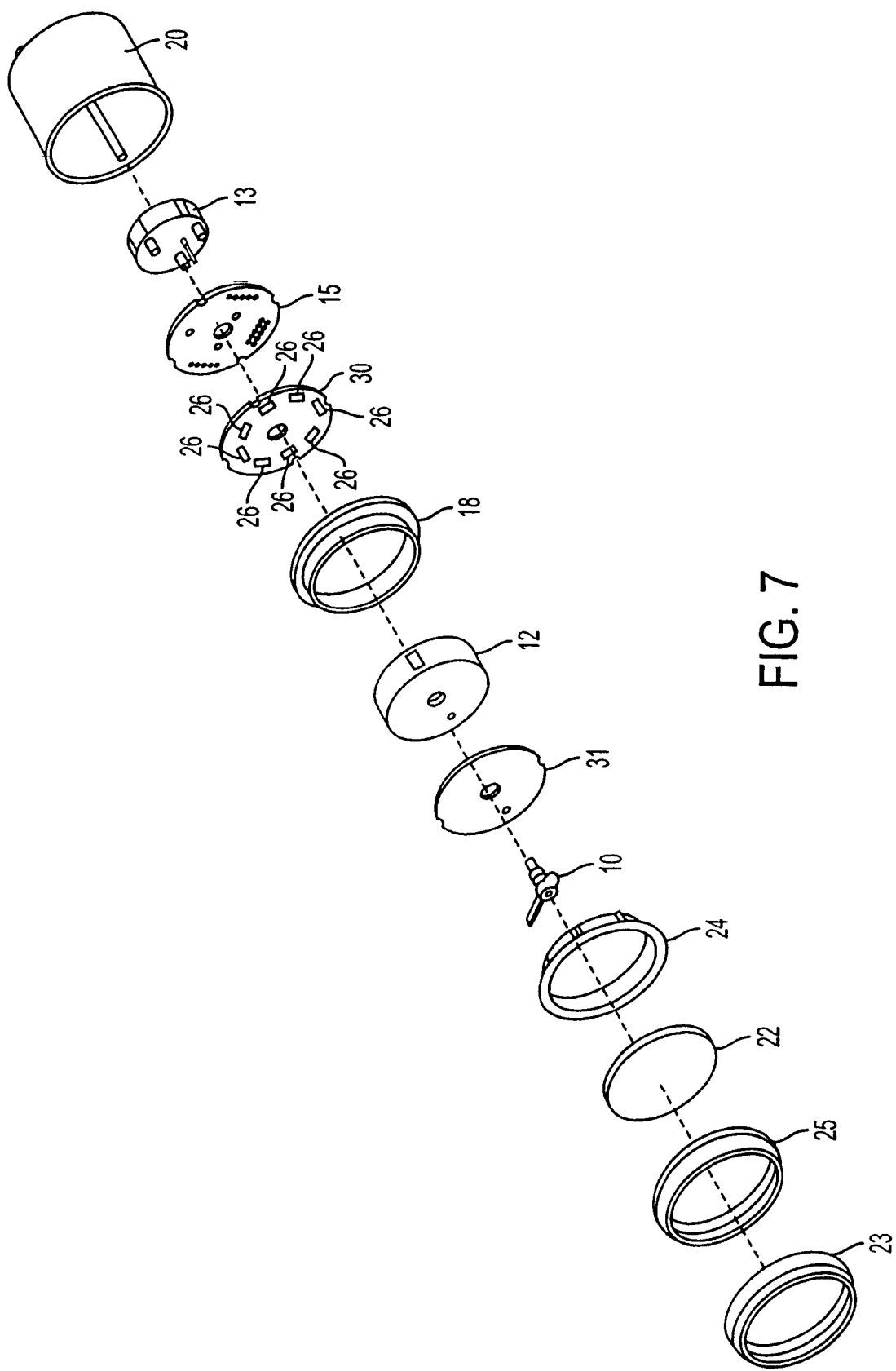
FIG. 7 is an exploded perspective of the gauge of FIG. 1.

Referring now to FIGS. 1 and 2, there is shown an automotive gauge having a light-transmitting pointer 10 mounted for rotational movement across the face of a dial plate 11 formed as the end wall of a cylindrical cup 12 that is open at its inner end. The pointer 10 is mounted to maintain a clearance between the dial face and the rear surface of the pointer, and is driven by a small electric motor 13 controlled by electrical circuitry on a printed circuit board (PCB) 15, illustrated in FIG. 7. The motor 13 has an output shaft 16 that fits into a mating hole in a stem 17 extending rearwardly from the pointer 10 and formed as an integral part of the pointer. A stop pin 14 may optionally be included to limit the pivoting movement of the pointer 10 across the dial, for precise positioning of the pointer during automatic re-calibration, as is known in the art.

The entire gauge mechanism and control circuitry is enclosed in a cylindrical housing 20 having a closed back end 21 and an open front end for receiving a lens 22 and a bezel 23 covering the outer peripheries of the lens 22 and the open front end of the housing 20. The lens 22 is supported on a retainer ring 24 that rests on the open end of the housing 20 and extends downwardly to the face of the dial plate 11. A sealing ring 25, illustrated in FIG. 7, fits inside the bezel 23 to provide a seal between the bezel 23 and the adjacent surfaces of the housing 20, lens 22 and retainer ring 24 to prevent ambient moisture and particulate matter from entering the interior of the gauge.

To illuminate the dial face, the cup 12 that forms the dial plate 11 is made of a light-transmitting material such as a clear plastic and is illuminated by light radiated from several side-fire light-emitting diodes ("LEDs") 26 mounted on a second PCB 30. The number of LEDs is chosen to best suit the illumination needs of the implementation. The LEDs 26 are positioned around the perimeter of the PCB 30 and face towards a pointer hub 10a. Further, the LEDs 26 are selected to provide light at the desired angle (i.e., wide angle LEDs may be use). The LEDs 26 are positioned rearwardly from the rear surface of the dial plate 11, and receive electrical power from connectors (not shown) that pass through the printed circuit board 15 to a power connection at the back end of the housing 20. The LEDs 26 are mounted at intervals around the central axis of the gauge, which is normal to the plane of the dial plate 11 and is also the axis of the pointer stem 17 and the output shaft 16 of the motor 13. The LEDs 26 may be spaced around the PCB 30 equally or randomly. The spacing may be predetermined to provide illumination best suited for the implementation.

Provided between the cup 12 and PCB 30 is a light ring 18. The light ring 18 directs light from the perimeter of the PCB 30 towards the pointer hub 10a. The light ring 18 also serves to limit the hot spots created by the close proximity of the LEDs 26 to the dial face. The width 19 of the light ring 18 is selected relative to the angle of the light emitted from the LEDs 26 to eliminate hot spots while still allowing light to reach the dial. Additionally, the light ring 18 may be formed to selectively illuminate portions of the dial face in a variety of shape and size arrangements. Alternatively if a non-transparent dial face is used, the light shield 18 is not necessary.

Light from the LEDs 26 is picked up by the inside surfaces of the dial-plate cup 12 and propagated throughout that cup so as to illuminate the dial plate 11 that forms the base plate of the dial face. A thin opaque face plate 31 is attached to the surface of the illuminated plate 11 to form the desired indicia on the dial face by covering portions of the plate 11 so that only the non-covered portions of the illuminated plate 11 are visible.

Figure 3:
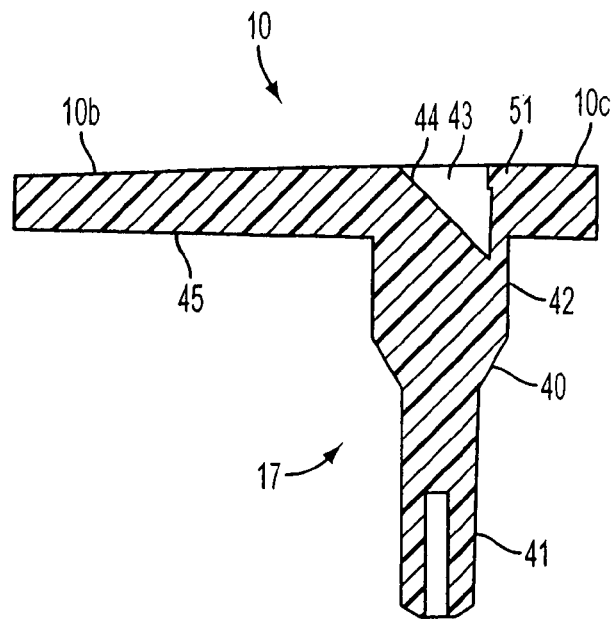
FIG. 3 is an enlarged longitudinal cross-sectional view of the pointer in the gauge of FIG. 1.

In accordance with one aspect of the present invention, the pointer, illustrated in FIG. 3, is made of a transparent or translucent material, preferably colored, and is illuminated by the light from the same light source that illuminates the dial face. Thus, in the illustrative embodiment of FIG. 1, light from the LEDs 26 is captured by a tapered transition 40 on the pointer stem 17, rearwardly of the dial plate 11. This tapered transition 40 is located between a narrow distal portion 41 of the stem 17 and a wide proximal portion 42 that extends forwardly through the dial plate 11. The transition is located such that a portion of the light radiating from the LEDs 26 impinges on the tapered transition 40, as illustrated by the dashed line in FIG. 1. Light thus enters the wide portion 42 of the transparent or translucent stem 17 via the tapered transition 40 and propagates forwardly through the wide portion 42 of the stem 17.

The tapered transition 40 is coaxial with the stem 17 and is uniform around the entire circumference of the stem 17, so that the exterior surface of the transition captures substantially the same amount of light regardless of the angular position of the pointer. This arrangement illuminates the pointer without the use of a separate light source dedicated to the pointer, and illuminates the pointer with a brightness that is consistent and non-fluctuating regardless of the angular position of the pointer. The surface of the transition 40 forms an angle with respect to the axis of the stem 17. The contour of the transition 40 is selected to propagate light through the pointer 10. The preferable angles of the transition 40 is between 15° and 60°, however the invention is not limited to this angular range. Further, the transition 40 is not limited to the tapered transition construction illustrated in FIG. 1. The transition 40 may be implemented using a variety of transition designs including the spherical shaped transition 40 illustrated in FIG. 2. The key feature of each transition contour construction is the ability to capture light from the LEDs 26. Other configurations of the pointer 10 are contemplated, including a pointer stem 17 of a constant width over the entire length of the pointer stem 17. The exterior surface of the transition 40 is preferably a highly polished surface, which may be achieved by molding the pointer from a polymeric material in a mold in which that portion of the mold surface that forms the transition 40 is treated to form a very smooth surface.

To direct the light that propagates forwardly through the stem 17 laterally into the pointer 10, a recess 43 in the upper surface of the pointer hub 10a forms a reflecting surface 44 extending at a 45° angle to the axis of the stem 17. The forwardly propagating light impinges on this surface 44 and is reflected laterally (downwardly as viewed in FIG. 2) toward the free end of the indicator portion 10b of the pointer 10, thus illuminating the indicator portion 10b. The rear surface 45 (FIG. 3) of the indicator portion 10b of the pointer is preferably coated with a reflective material, such as an opaque white paint, to improve the uniformity of illumination of the indicator portion and to increase the amount of light that reaches the top and side surfaces of the indicator portion.

Figure 4:
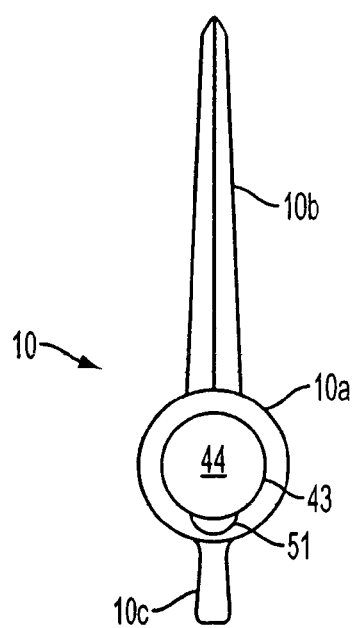
FIG. 4 is a top plan view of the pointer shown in FIG. 2.
Figure 5:
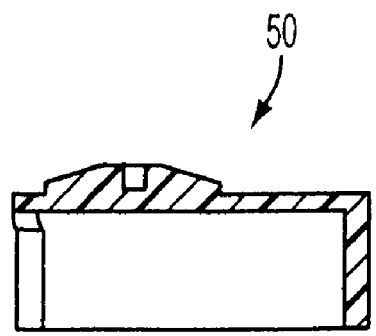
FIG. 5 is a longitudinal cross-sectional view of a cap for the tail portion of the pointer in the gauge of FIG. 1.
Figure 6:
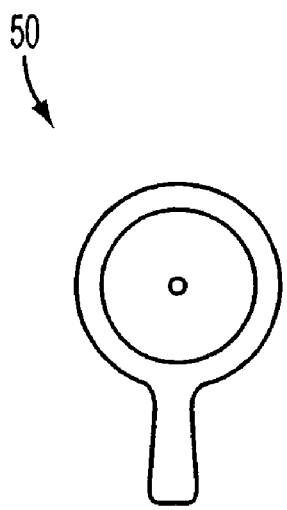
FIG. 6 is a top down plan view of the cap shown in FIG. 4.

To conceal the pointer stem 17, an opaque cap 50, illustrated in FIGS. 4-6, fits over the front of the hub portion 10a and tail portion 10c of the pointer 10. This cap 50 is notched to fit over the indicator portion 10b that extends laterally from the hub portion 10a, so that only the indicator portion 10b is visible from the front of the gauge, even though the hub and tail portions of the pointer are also illuminated beneath the opaque cap 50. If desired, the cap 50 can be made of a translucent material to reveal the entire illuminated pointer, including the hub and tail portions 10a and 10c, with the cap 50 serving to attenuate light from the brightest regions of the pointer and thereby make the illumination more uniform along the entire length of the pointer 10. The cap 50 can also be made of a color different from that of the pointer 10. A notch 51 formed in the tail side of the recess 43 reflects more light into the tail portion 10c when it is desired to illuminate that portion of the pointer.

One advantage of the above described invention is that it allows for the space between the LEDs 26 and the back of the dial face plate 11 to be reduced. The compact design of the gauge allows for the gauge to be used in a wider variety of implementations, and particularly an implementation in which space is limited. Further, the spacing of the LEDs 26 provides the ability for the invention to be implemented in variety of gauge arrangements, including either as a full or short sweep gauge.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

What is claimed as new and desired to be protected by Letters Patent of the United States is:

1. A gauge comprising:
   a dial plate including a front surface;
   a light-transmitting pointer configured for rotational movement about an axis normal to said dial plate, said pointer extending through the dial plate and having a hub concentric with said axis and an indicator projecting laterally from said hub over the front surface of said dial plate, said hub having a tapered transition portion and a reflective surface configured to direct the light onto said indicator, said tapered transition portion configured to redirected light to said reflective surface of said hub;

at least one light source positioned rearwardly from a rear surface of said dial plate and proximate a perimeter of said dial plate, the at least one light source being configured to illuminate the front surface of the dial plate and the light-transmitting pointer; and a light shield between said at least one light source and said dial plate and configured to direct light from the at least one light source toward the light-transmitting pointer and block light from transmitting along a direct path from the at least one light source to the dial plate in a direction normal to the dial plate.

2. The gauge of claim 1, wherein said light shield is configured for reducing or eliminating hot spots from said front surface of said dial plate.

3. The gauge of claim 1, wherein a width of said light shield is selected based on an angle of the light emitted from said at least one light source.

4. The gauge of claim 1, wherein the at least one light source and said light shield are configured to illuminate the dial plate with a pattern of light having a shape different than said dial plate.

5. The gauge of claim 1, further comprising:
a face plate that covers portions of the dial plate so that only non-covered portions of the dial plate are illuminated by said at least one light source.

6. The gauge of claim 1, wherein said reflective surface is located in a recess in an upper surface of said hub.

7. The gauge of claim 1, wherein said tapered transition is spherically shaped.

8. The gauge of claim 1, wherein the angle between said axis and an outer surface of said tapered transition portion is about 45 degrees.

9. The gauge of claim 1, wherein the angle between said axis and an outer surface of said tapered transition portion is about 15 degrees.

10. The gauge of claim 1, wherein the angle between said axis and an outer surface of said tapered transition portion is about 60 degrees.

11. The gauge of claim 1, wherein gauge is either a full or short sweep gauge.

12. The gauge of claim 1, wherein said at least one light source are side-fire light-emitting diodes.

13. The gauge of claim 1, further comprising:
a cup for reflecting the light from said at least one light source on to said rear surface of said dial plate.

14. The gauge of claim 1, wherein said indicator comprises a reflective backing configured to receive the light from said reflective surface of said hub and to reflect the light away from the said dial plate.

15. A gauge having an illuminated dial and pointer, comprising:
a light-transmitting dial plate having a front surface;
a light-transmitting pointer configured for rotational movement about an axis normal to said dial plate, said pointer having a hub concentric with said axis, extending through said dial plate, and projecting both forwardly and rearwardly from said plate, and including an indicator projecting laterally from said hub across a portion of the front surface of said dial plate and an illuminating portion configured to redirect light from said hub laterally into said indicator;

at least one light source facing towards said hub and positioned rearwardly from a rear surface of said dial plate and proximate an outer perimeter of the dial plate, said light source being configured for illuminating the light-transmitting pointer, wherein said hub intercepts light from said light source, propagates the light forwardly to said illuminating portion, and thereby illuminates said indicator; and a light shield positioned between said at least one light source and said dial plate and configured to direct light from the at least one light source toward the hub and block light from the at least one light source from transmitting along a direct path to the dial plate in a direction normal to the dial plate.

16. The gauge of claim 15, wherein said light shield is configured for reducing or eliminating hot spots from said front surface of said dial plate.

17. The gauge of claim 15, wherein the illuminating portion of said pointer is in a recess in an upper surface of said hub.

18. The gauge of claim 15, wherein said gauge is either a full or short sweep gauge.

19. The gauge of claim 15, wherein said at least one light source are side-fire light-emitting diodes.

20. The gauge of claim 15, further comprising:
a cup for reflecting the light from said at least one light source on to said rear surface of said dial plate.

21. The gauge of claim 15, wherein said hub comprises a small-diameter portion located behind said dial plate, a large-diameter portion extending through said dial plate, and a tapered transition portion between said small-diameter and large-diameter portions, said tapered transition portion being located closer to the rear surface of said dial plate than said light source and forming a tapered outer surface configured for intercepting light from said light source so that said light enters said hub, propagates forwardly through said hub, and redirects laterally from said illuminating portion of said pointer into said indicator.

22. The gauge of claim 21, wherein said tapered transition is spherically shaped.

23. The gauge of claim 21, wherein the angle between said axis and said tapered outer surface of the transition is about 45 degrees.

24. The gauge of claim 21, wherein the angle between said axis and said tapered outer surface of the transition is about 15 degrees.

25. The gauge of claim 21, wherein the angle between said axis and said tapered outer surface of the transition is about 60 degrees.

26. The gauge of claim 15, wherein said indicator comprises a reflective backing configured to receive the light from said illuminating portion of said pointer.

27. A method of illuminating a gauge having a light-transmitting dial plate and a light-transmitting pointer having a hub and an indicator, said method comprising:
emitting light from a light source, the light source being provided at a perimeter portion of the gauge and rearward of the light-transmitting dial plate;
receiving the light from said light source at the light-transmitting dial plate and at a tapered outer surface of the light-transmitting pointer so that the light enters the light-transmitting dial plate and the light-transmitting pointer and propagates forwardly therethrough;

directing light from the light source toward the light-transmitting pointer using a light shield positioned between the light source and the light-transmitting dial plate; and blocking non-reflected light from the light source from transmitting along a direct path to the light-transmitting dial plate in a direction normal to the light-transmitting dial plate.

28. The method of claim 27, wherein said light source comprises multiple light-emitting diodes spaced around an axis of the pointer.

29. The method of claim 27, wherein said tapered outer portion is spherically shaped.

30. The method of claim 27, further comprising illuminating said dial plate with said light source using a plurality of light emitting diodes.

31. The method of claim 27, further comprising:
reflecting the light from said light source on to said dial plate using a cup.

32. The method of claim 27, wherein said light shield is configured for reducing or eliminating hot spots from said front surface of said dial plate.

33. A gauge having an illuminated dial face and pointer, comprising:
a dial plate having a front surface;
a hub configured to rotate and extending through the dial plate;
an indicator projecting laterally from the hub and over the front surface;
an illuminator configured to redirect light from the hub to the indicator;
at least one side fire LED light source directed toward said hub and positioned rearward of the dial plate and configured to indirectly illuminate the front surface and the indicator, wherein light from the light source is transmitted via said dial plate to the front surface and via the hub and the illuminator to the indicator; and
a light shield between the light source and the dial plate that directs light emitted from the light source toward the hub and prevents light emitted from the light source from transmitting along a direct path to the dial plate in a direction normal to the dial plate.

* * * * *